United States Patent [19]

Harke et al.

[11] Patent Number: 4,560,527

[45] Date of Patent: Dec. 24, 1985

[54] METHOD OF MAKING AGGLOMERATED CELLULOSIC PARTICLES USING A SUBSTANTIALLY HORIZONTAL ROTATING DRUM

[75] Inventors: Elwood W. Harke, Outagami County; Robert C. Sokolowski, Calumet County; Russell L. Johnson, Waupaca County, all of Wis.

[73] Assignee: Kimberly-Clark Corporation, Neenah, Wis.

[21] Appl. No.: 603,391

[22] Filed: Apr. 24, 1984

[51] Int. Cl.$^4$ .............................................. B29C 67/02
[52] U.S. Cl. ...................................... 264/500; 119/1; 162/9; 162/231; 162/DIG. 9; 264/15/117
[58] Field of Search .................... 264/117, 15, 500; 162/9, 231, DIG. 9; 119/1

[56] References Cited

U.S. PATENT DOCUMENTS

| | | | |
|---|---|---|---|
| 3,449,106 | 6/1969 | Paden et al. | 264/117 X |
| 3,506,536 | 4/1970 | Jacquelin | 162/9 X |
| 3,589,977 | 6/1971 | Fournet | 162/9 |
| 3,789,797 | 2/1974 | Brewer | 119/1 |
| 3,904,726 | 9/1975 | Jacquelin et al. | 264/117 |

FOREIGN PATENT DOCUMENTS

| | | | |
|---|---|---|---|
| 0039522 | 11/1981 | European Pat. Off. | 119/1 |
| 1454743 | 1/1969 | Fed. Rep. of Germany | 264/117 |

*Primary Examiner*—Jan Silbaugh
*Attorney, Agent, or Firm*—Donald L. Traut

[57] ABSTRACT

A method of making agglomerated cellulosic particles, particularly useful as a cat litter, comprises agglomerating a moist blend of fibers, aggregates of fibers, and/or fiber-sized pieces of a fibrous cellulosic material in a substantially horizontal rotating drum to form agglomerated particles; compacting surfaces of the particles; and drying the particles.

10 Claims, 4 Drawing Figures

FIG. 4

METHOD OF MAKING AGGLOMERATED CELLULOSIC PARTICLES USING A SUBSTANTIALLY HORIZONTAL ROTATING DRUM

BACKGROUND OF THE INVENTION

This invention relates to a method of making agglomerated cellulosic particles, especially adapted for use as an animal litter.

Commercially available cat litters frequently contain clay. Clay litters have disadvantages in that they are heavy, dusty, and stick together in the bottom of the litter box after use. In addition, because clay litters have low absorbency, cat urine tends to pool on the bottom of the litter box and creates an odor problem as bacterial growth increases.

In an attempt to overcome the disadvantages of clay litters, other commercially available cat litters are made from cellulosic materials such as newsprint and alfalfa. These products contain water-soluble binders and are produced by extrusion and pelletization of the extrudate. However, such products also suffer from disadvantages. In particular, during use the pellets swell and break apart, resulting in a mess in the litter box. Also, these products are dusty in spite of the presence of binders because the exposed ends of the pellets are not protected by a hardened skin.

Therefore, it is an object of this invention to provide a particle, especially useful as an animal litter, which is light, substantially dust-free, absorbent, easy to clean up, and which wicks away free liquid and allows absorbed moisture to evaporate to mitigate bacterial growth. It is a further object of this invention to provide a particle having other uses such as a floor sweeping material, a packing material, a mulch, or a carrier for other material such as scents, disinfectants, germicides, or the like.

SUMMARY OF THE INVENTION

The invention resides in a method for making agglomerated cellulosic particles comprising (a) agglomerating a moist blend of fibers, aggregates of fibers, and/or fiber-sized pieces of a fibrous cellulosic feed material, such as wastepaper and/or paper mill sludge, in a substantially horizontal rotating drum to form individual agglomerated particles; (b) compacting the surface of the agglomerated particles to form a densified skin substantially free of protruding fiber ends and/or fibrils; and (c) drying the agglomerated particles. Preferably, the particles are slightly flattened prior to final drying to form platelet-like particles which have less tendency to roll. This is particularly advantageous when the particles are used as an animal litter.

This and other aspects of this invention will be described in greater detail by reference to the Drawing.

BRIEF DESCRIPTION OF THE DRAWING

FIG. 4 illustrates a simplified process wherein a rotating drum is used to agglomerate the particles and also compact their surfaces with partial drying.

DETAILED DESCRIPTION OF THE DRAWING

Figure 1:
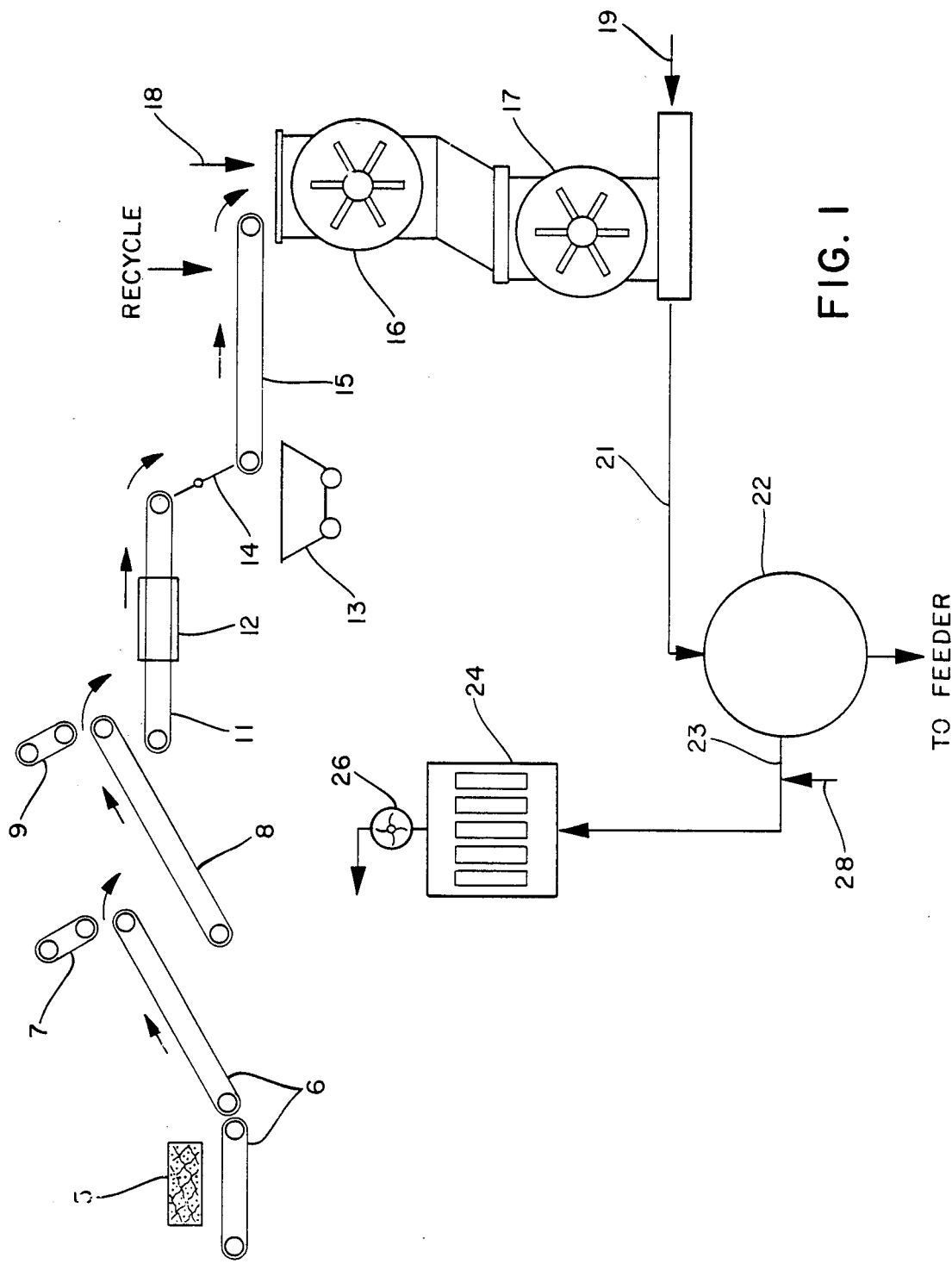
FIG. 1 is a schematic flow diagram illustrating how a raw feed material can be prepared for use in the method of this invention.

Referring to FIG. 1, preparation of feed material for the method of this invention will be described in greater detail. FIG. 1 shows a means for providing a fibrous cellulosic material suitable as a feed material for agglomeration. "Fibrous cellulosic materials", for purposes herein are fibrous cellulosic materials which are substantially free of natural binders such as lignin, tars, and pitches naturally present in plant life. These natural binders cause the cellulosic fibers to be stiff and inflexible, which is undesirable for the purposes of this invention. Theses binders are normally removed by extraction in a papermaking pulping process. Therefore, cellulosic materials which have undergone digestion in a pulping operation are particularly suitable. Such suitable materials specifically include wastepaper (including newsprint, cardboard, etc.), paper mill sludge, and combinations thereof. As used herein, "paper mill sludge" is a general term, including primary tissue mill sludge and other types of sludge resulting from papermaking processes, which describes a dewatered waste product from paper mills primarily containing short cellulose fibers which have passed through the forming wire of a wet forming papermaking process. It will be appreciated that the feed preparation steps illustrated in FIG. 1 are not necessary for all raw fibrous cellulosic materials, such as paper mill sludge, which can be fed directly into the process of this invention if its water content is not too high to prevent agglomeration. However, paper mill sludge can also be subjected to the process of FIG. 1 in combination with other raw materials to the extent that its water content does not adversely affect the operations, particularly the fiberization step.

Specifically shown in FIG. 1 are bales of wastepaper 5 being conveyed on a belt conveyor 6 to a suitable bale breaker 7 which initially breaks up the bales into a more manageable form. The broken bale material from the bale breaker is deposited onto another conveyor 8 and is metered by rake-back rolls 9 onto a third conveyor belt 11 which carries the material past a metal detector 12. The metal detector signals an operator in the event any metals are present which may damage subsequent apparatus and must be removed. Undesirable materials can be deposited into a tote box 13 with the aid of a suitable means such as a pivotable deflecting plate 14.

The fibrous cellulosic material is then suitably conveyed, as by conveyor belt 15, to one or more fiberization or attrition devices such as hammermills 16 and 17, which are designed and operated in a manner familiar to those skilled in the art of fiberization. The purpose of the hammermills or any other attrition device used herein is to shred or fiberize the raw material into small fiber-sized pieces, including individual fibers and aggregates of fibers. (For purposes herein, "fiber-sized" means a size on the order of about ¼ inch × ¼ inch or less. As the pieces become larger, it becomes increasingly difficult to process the material into the smooth-surfaced particles described herein.) Forced air is continuously directed into the hammermills, such as through line 18, to keep the material moving through the hammermills. A particular feed mixture which has been successfully processed through the hammermills, for purposes of illustration, contained (by weight) 25% newsprint, 60% clay-coated glue-grade waste paper, and 15% primary tissue mill sludge (containing about 75 weight percent water). Paper mill sludge typically contains from about 60 to about 90 weight percent water and therefore could cause plugging in the hammermills if present in too large an amount. Hammermills may plug up if the total moisture content of the fibrous cellulosic material approaches about 20 weight percent or so. Hence when paper mill sludge is used it must be blended with other dry feed materials to "dilute" the moisture level. It is preferable that the paper mill sludge be added to the system after the hammermills to avoid any such problems. Of course, if paper mill sludge is to be used as the sole feedstock, the feed preparation steps illustrated in FIG. 1 are unnecessary.

The resulting fibers, aggregates of fibers and/or fiber-sized pieces of the fibrous cellulosic material are conveyed, with the aid of additional forced air through line 19, from the hammermill 17 through a conduit 21 to a fiber condenser drum 22 wherein the material is allowed to settle. Fines and dust present in the airspace above the settling fibers are drawn out of the fiber condenser drum 22 via conduit 23 and directed to a baghouse 24 where they are filtered out of the air and recycled or disposed. A suitable fan 26 provides the necessary means for drawing the air and dust into the baghouse. Additional dust conveyed through line 28 from a dust hood located at the hopper of the screw feeder of FIG. 2 is also directed to the baghouse.

Figure 2:
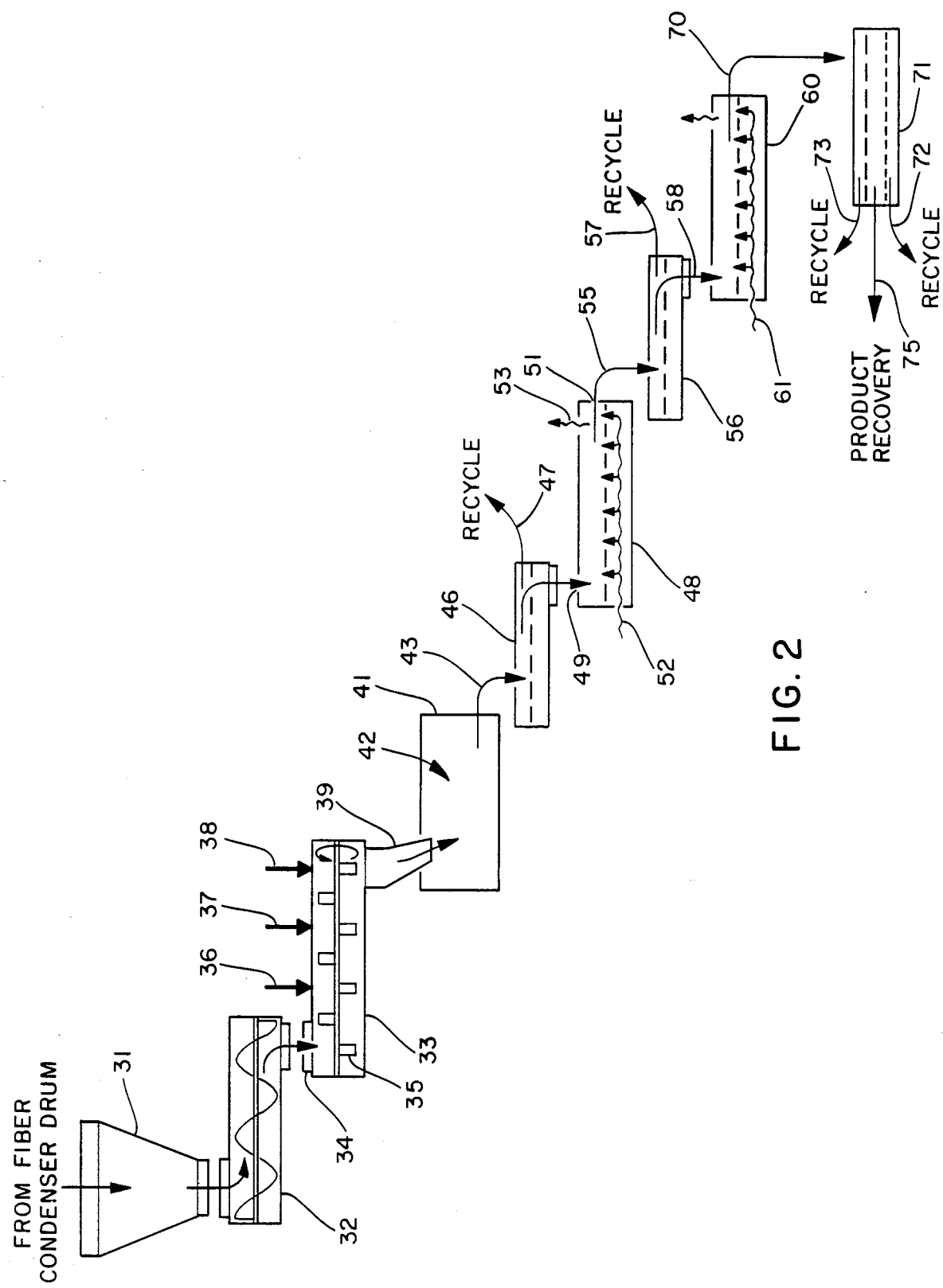
FIG. 2 is a schematic flow diagram of one embodiment of this invention illustrating the essential agglomeration, surface compaction, and drying steps of this invention.

FIG. 2 illustrates a method embodying the steps of this invention, i.e. the steps of agglomerating fibers, aggregates of fibers, and/or fiber-sized pieces of the fibrous cellulosic feed material in a substantially horizontal rotating drum to form particles, compacting the surfaces of the agglomerated particles, and drying the particles. As will become apparent from this specification, the steps of agglomeration, surface compaction, and drying are not necessarily accomplished in three separate pieces of apparatus. More typically, one substantially horizontal rotating drum will simultaneously agglomerate and compact the surface of the particles or alternatively compact the surfaces of the particles and simultaneously dry the particles. In fact, as disclosed in connection with FIG. 4, one substantially horizontal rotating drum can accomplish all three process steps. Directing attention back to FIG. 2, fibers, aggregates of fibers, and/or fiber-sized pieces of a fibrous cellulosic feed material from a suitable source, such as the fiber condenser drum 22 of FIG. 1 and/or a source of paper mill sludge, are fed into a feeding device such as the hopper 31 of screw conveyor 32 which serves to controllably meter the feed material to the blender 33. Optionally, additional ingredients such as odor absorbants (e.g. sodium bicarbonate, activated carbon, borax, etc.), anti-static agents, binders such as starch (less than about 10 weight percent), flame retardants, etc., can also be added at this point in the process to the extent that such additives are desired as processing aids or to impart certain characteristics to the final product. Anti-static agents are particularly useful for reducing the tendency of the final product particles to cling to an animal's fur, as when used as a cat litter. Quaternary ammonium salts, such as di-coco-dimethyl-ammonium chloride or methylbis (2-hydroxyethyl) cocoammonium nitrate, are suitable anti-static agents for this purpose and can be added at levels from about 0.5 to about 5 dry weight percent based on the air dry weight of the fibrous cellulosic material. Any dust generated in the hopper can be removed by a suitable vented hood system which directs the dust to the baghouse.

In the blender 33, the fibers, aggregates of fibers, and/or fiber-sized pieces of the fibrous cellulosic feed material are thoroughly blended or mixed with an amount of water which is sufficient or almost sufficient for agglomeration. Agglomeration is a process wherein particle size is increased around a nucleation site by continual rolling or tumbling of the particles. This motion increases the exposure of the growing particles to the fibers, aggregates of fibers, and fiber-sized pieces of the fibrous cellulosic feed material, thereby affording an opportunity for intimate contact and growth by mechanical intertwining of fibers and adhesion. It has been found that when the proper moisture level is achieved for any given blend of such fibrous cellulosic feed material, agglomeration occurs very readily. As the moisture level of the blend is increased still further, larger agglomerated particles can be formed. Of course, if too much moisture is present, a slurry will be formed and agglomeration will not occur at all. Therefore the blender primarily serves to condition the fibrous cellulosic feed material for the subsequent agglomeration step. The agglomerated particle size can thus be somewhat controlled by the moisture level. The blender suitably consists of a tubular vessel with an inlet 34 and a series of internally axially rotating tynes or paddles 35 (paddles are illustrated) which mix and move the feed material toward the exit 39. If tynes are used, virtually no agglomeration takes place in the blender. However, if paddles are used it has been found that some agglomeration will occur in the blender, which is advantageous because there is accordingly a lesser burden on the subsequent apparatus to effect agglomeration. The blender also preferably contains multiple water inlet ports, such as 36, 37, and 38, which are desirable to achieve proper moisture control. Warm water, if available, may be preferable because it more readily softens cellulosic fibers. A specific apparatus which has been used successfully is manufactured by Ferro Tech (Model 12T35). It has been found advantageous to add the water in stages as shown to provide better distribution. For example, about 80 percent of the water to be added to the blender can be added through the first port 36, about 10–20 percent can be added through the second port 37, and the remainder, if any, can be added through port 38. The moisture content of the blended material leaving the blender should be in the range of from about 50 to about 80 weight percent based on the air dry weight of the cellulosic fibers, but the precise level must be optimized for the specific feed material and the specific agglomeration device(s) being used. At this stage of the process the moist blended material can exhibit a degree of agglomeration, although much of the material can be described as a very loose, crumbly mass with little individual particle integrity.

The moist blend of fibers, aggregates of fibers, and fiber-sized pieces of the fibrous cellulosic feed material leaving the blender is then deposited into a substantially horizontal rotating drum 41 (rotating about its axis) which primarily serves to roll the moist material into agglomerated particles and to complete any agglomeration which may have occurred in the blender. The rotating drum also serves to simultaneously compact the surface of the particles to form a densified skin as will hereinafter be described. A 23 inch inside diameter drum which is 5½ feet long and rotating at 22 r.p.m. has been found sufficient for purposes of agglomeration at a production rate of about 50 lbs. of air dry cellulosic fiber per hour. Although the substantially horizontal rotating drum is preferably level, it can be slightly inclined or declined to increase or decrease the average particle residence time as desired. The ends of the drum are open, except for a circumferential wall at the inlet end to prevent material from falling out. Movement of the particles from one end of the rotating drum to the other occurs naturally as the particles seek the lowest level and fall out of the outlet end of the drum. The space occupied by the particles within the rotating drum is relatively small based on the internal volume of the drum. Typically, the volume percentage occupied by the particles is only about 2 to about 5 percent. This permits the particles to ride up the inside of the drum during rotation and, upon reaching a certain point, fall or roll back down to the bottom of the drum to create a mixing or rolling action. Additional water 42 can be added to the rotating drum to further enhance the agglomeration process as necessary. It can be advantageous, for example, to add some of the water at this point if the material in the blender would otherwise be too wet to leave the blender properly. It has been found that from about 0 to about 30 weight percent additional water is preferable. This can be easily accomplished with suitably positioned spray nozzles inside the drum which are preferably positioned near the inlet of the drum to provide the necessary agglomeration moisture as soon as possible to the material to be agglomerated. The moisture content of the material at this point should not exceed about 85 weight percent and preferably not exceed about 80 weight percent if cat litter is the desired end use of the particles. Higher moisture levels can cause formation of particles which are too large for this purpose.

The agglomerated particles 43 leaving the horizontal rotating drum typically have a moisture content of from about 75 to about 80 weight percent. The particle size typically ranges from about 1/32 inch to about 5/8 inch in diameter or larger. The particles are classified in a vibratory expanded metal screen 46 to remove the particles larger than 5/8 inch, which are recycled through conduit 47 to the hammermills. These particles are preferably rejected because they are too large for cat litter and are difficult to dry relative to the smaller particles. However, the particles retained for further processing will eventually shrink as much as about 30 percent in size by the time they are dried. Hence, particles at this stage of the process which are larger than the final desired size can be retained.

The agglomerated particles leaving the drum may also contain protruding fiber ends and/or fibrils. These exposed fiber ends and fibrils are undesirable if the particles are to be ultimately used as a cat litter because they cause the particles to cling to the cat's fur and therefore can be tracked away from the litter box. Therefore it is necessary that the surfaces of the agglomerated particles be substantially smooth. One way of accomplishing this is to compact the surfaces of the particles by rolling or bouncing the moist particles, as in a vibratory fluidized bed dryer, wherein the surfaces of the particles are compacted while being only partially dried. The same surface compaction can also be accomplished, for example, in a second substantially horizontal rotating drum, which preferably has a teflon-coated inner surface which prevents the particles from sticking and therefore improves the surface compaction. The surface compaction step must be performed while the particles have at least about 15 weight percent moisture and serves not only to reduce the numbers of protruding fiber ends and fibrils, but also enhances the strength of the hydrogen bonding in the surface of the particles by increasing fiber-to-fiber contact in the surface. Compaction imparts a smoother surface to the particles and also gives the particles a more dense skin which resists dust formation and preserves particle integrity when heavily moistened.

Directing attention back to FIG. 2, the particles of acceptable size passing through the screen 46 are directed to a hot air fluidized bed dryer 48 to further compact the surfaces of the particles and to reduce the moisture content to preferably about 30 weight percent. A particular dryer which has been found to be suitable has a vibrating bed plate surface of 32 square feet with a 3% open area and is 16 feet long. The agglomerated particles enter the dryer at the inlet 49 and leave the dryer through outlet 51. Hot air at about 380° F. (6700 standard cubic feet per minute) enters at inlet 52 and is upwardly directed through a large number of orifices in the bed plate. The air exhausts at outlet 53. A particle residence time of about 30–60 seconds has been found to be suitable, which, for the particular apparatus used, corresponds to a particle bed height (at rest) of about ½ inch. In operation, the fluidized particle bed has a very low density. In fact, the smaller particles may rise as high as about one foot above the bed plate. The larger particles tend to merely roll along on the surface of the bed plate, urged toward the outlet by the vibratory motion imparted by a suitable vibrating means connected to the bed plate. Dust contained in the exhaust from the dryer can be directed to the baghouse for disposal or recycle.

The surface-compacted agglomerated particles leaving the first fluidized bed dryer 48 typically have a moisture content of about 30 weight percent. A moisture content of from about 15 to about 50 weight percent is considered suitable to permit good surface compaction and still retain particle integrity during subsequent processing. The shape of the agglomerated particles at this stage of the process is generally spherical, although bumpy and irregular. The surfaces of the bumps, however, are smooth. If desired, the surface-compacted agglomerated particles 55 can be screened in a second vibratory screen 56 to remove any particles 57 of unwanted size, either large and/or small.

The acceptable particles 58 are then directed to a final drying means, such as a second vibrating fluidized bed dryer 60, in which the particles are dried to a moisture content of about 10 weight percent or less, preferably about 5 weight percent, to inhibit bacterial growth which is enhanced by high moisture levels. Because the sole purpose of this fluidized bed dryer is to dry the particles, for economy it is preferably operated in a manner wherein the fluidized particle bed is much more dense than in the first dryer. Typically, the bed height will be about one or two inches during operation and accordingly less air through conduit 61 is supplied to the bed than for the first dryer. By way of example, about 3000 standard cubic feet per minute of hot air (475° F.) is supplied to the final dryer, which can be physically identical to the first. Particle residence times can also be about the same as in the first dryer, but can vary greatly as desired. Obviously, the design of both dryers can be altered by anyone skilled in the art to meet the demands of a particular system.

The dried, surface-compacted, agglomerated particles 70 leaving the second dryer are preferably deposited onto a third vibratory screening apparatus 71 to remove any particles which are either too large or too small for the desired end use. These particles can be recycled to the hammermills. The preferred screening apparatus shown uses a double screen which recycles particles 72 which are less than 1/16 inch in diameter and particles 73 which are greater than 3/8 inch in diameter. (As used herein, "diameter" refers to the largest linear dimension of the particle and is not intended to imply that the particle has a true circular or spherical shape.) This size classification has been found to be preferred for animal litters. As shown, the acceptable particles 75 leaving the center portion of the screen are recovered as a final product for bagging and packaging as desired. During packaging, fragrances such as encapsulated fragrances or oils can be mixed with the product to improve product acceptance.

Figure 3:
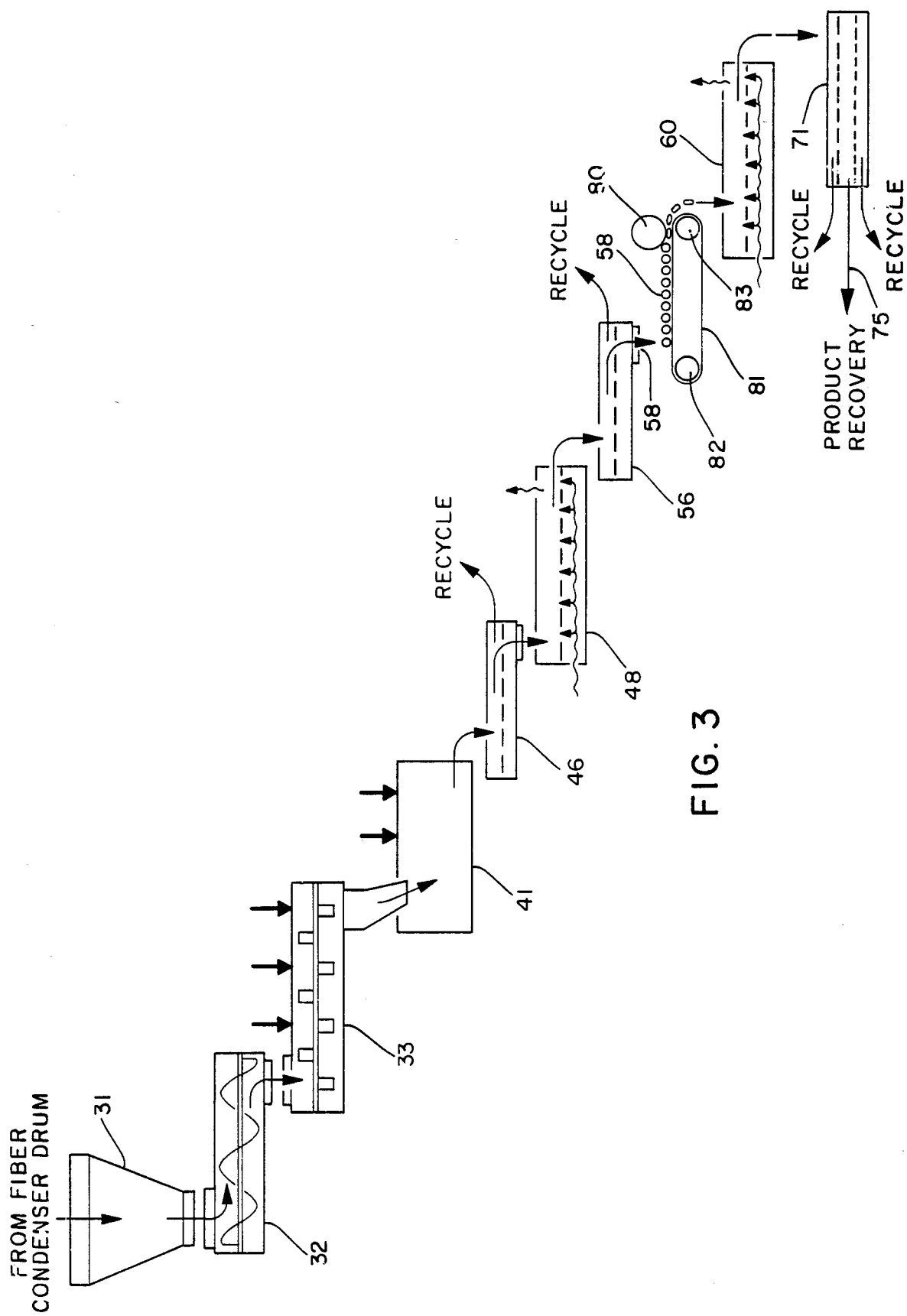
FIG. 3 illustrates a process similar to the process of FIG. 2, but additionally including an optional step wherein the particles are flattened to form platelets.

FIG. 3 illustrates a preferred optional step to the process of FIG. 2, wherein after the surface-compacted particles have been partially dried in the fluidized bed dryer 48 and screened, the particles 58 are formed into platelets in a suitable device. This can be accomplished, for example, by flattening the particles 58 by conveying them through a nip between a press roll 80 and a conveyor belt surface 81. The conveyor belt can be driven and supported by rolls 82 and 83. The shape of the particles is thereby changed from generally spherical to what is referred to herein as "platelet-like". This is advantageous because the platelet-like particles have less tendency to roll if they are scattered on the floor during use, thereby confining the particles to a smaller area for clean-up. It is important that this step be carried out with the particles in a moist condition (from about 15 to about 50 weight percent moisture) to avoid breaking the densified surface skin and causing the particles to crumble. On the other hand, in a moist condition the particles are susceptible to adhering to each other if pressed together under sufficient pressure. Therefore it is preferable to deposit the particles onto the conveyor belt substantially in a monolayer to avoid combining several individual particles into a larger single mass. If the particle size or height varies greatly among the particles present at this point in the process, it can be advantageous to classify and separately flatten small, medium, and large particles. Otherwise, for example, if the nip clearance is set for the larger particles, the smaller particles may pass through without being sufficiently flattened.

Figure 4:
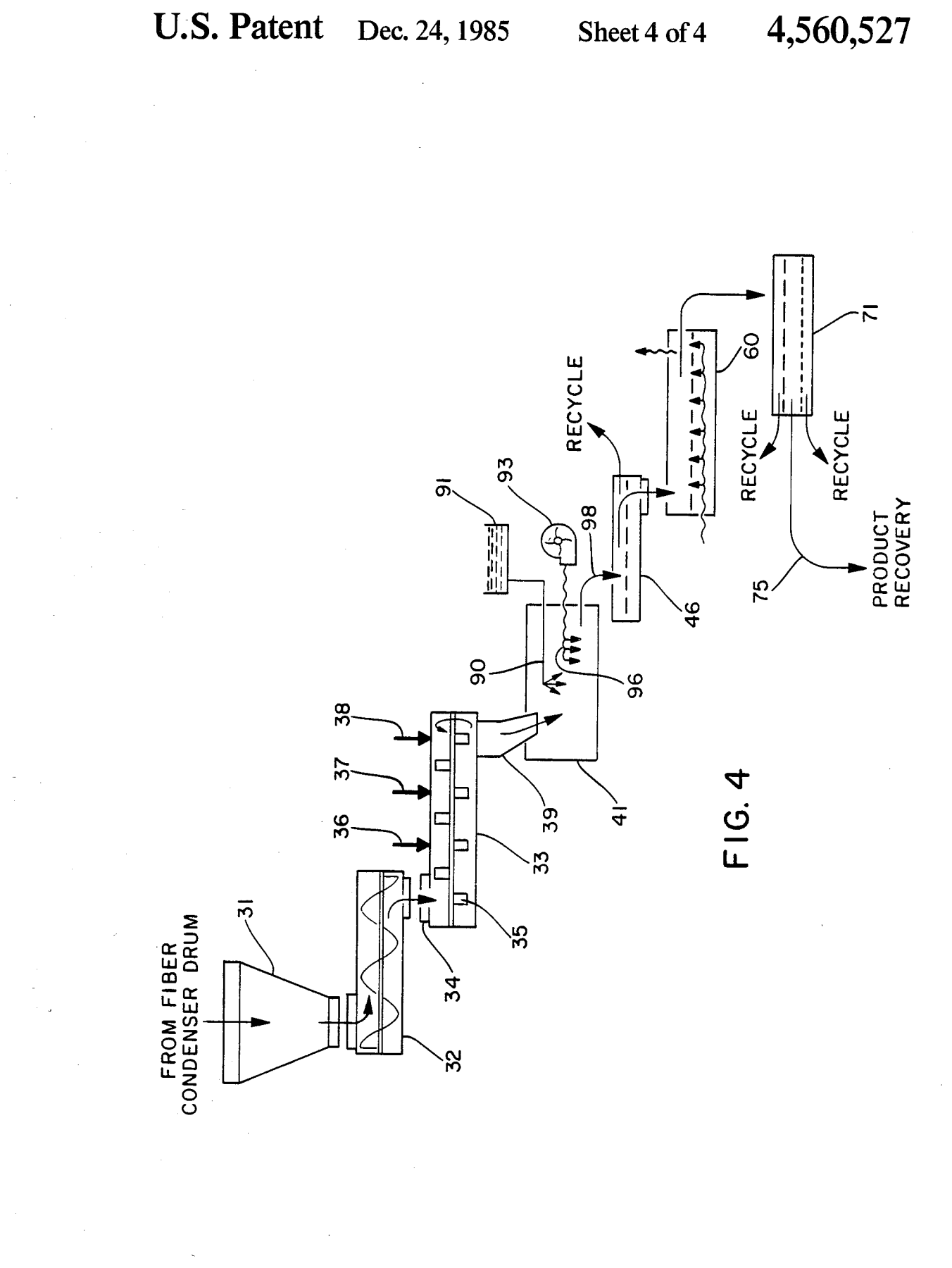

FIG. 4 represents another alternative embodiment of the process of this invention in which some of the equipment illustrated in FIGS. 2 and 3 is eliminated. This is accomplished by using a single substantially horizontal rotating drum to effect several steps, namely agglomeration, surface compaction, and partial drying. This can be done by extending the length of the rotating drum sufficiently to accommodate these process functions. As shown, as with the other illustrated embodiments, a suitable fibrous cellulosic material is deposited into the hopper 31, which supplies the material to a screw feeder 32. The material is metered into the inlet 34 of the blender 33, which is preferably of the rotating paddle-type which can cause some degree of preliminary agglomeration. As previously illustrated, the paddles 35 are mounted on an axially rotating shaft which mixes and moves the material to the outlet 39. Water addition is provided through inlet ports 36, 37, and 38 as before.

The moist blended material is then deposited into a substantially horizontal rotating drum 41, which is similar to the rotating drum previously described, except for its length. For a production rate of about 175 pounds of air dry cellulosic fiber per hour, a drum length of about 12 feet, an inside diameter of about 23 inches, and a rotational speed of about 25 r.p.m. is believed suitable. Inside the drum, near the inlet, a series of optional water spray nozzles 90 are suitably positioned to apply additional agglomeration water as needed as previously described. The nozzles are suitably connected to a water source 91. At a point nearer the outlet of the drum, hot air from a suitable source 93 can be directed at the particles by suitable nozzles 96. Alternatively or additionally, the surface of the drum or a portion thereof can be externally heated. In this manner the drum causes agglomeration in a first zone as previously described in connection with FIG. 2. In a second zone, after the water addition and agglomeration, the particles are continuously rolled over each other to compact and/or further compact their surfaces. In the third zone, the particles are partially dried, preferably to about 30-50% moisture, by the hot air and still further surface-compacted. The partially dried particles 98 leaving the rotating drum are then screened in a vibrating screen 46 as previously described, dried in a fluidized bed dryer 60 as previously described, and screened again in a vibrating screen 71 if necessary as previously described. Optionally, the particles leaving the screen 46 can be flattened into platelets prior to final drying as described in connection with FIG. 3.

As previously mentioned, agglomerated particles produced by the process of this invention are light in weight and highly absorbent and are particularly useful as a cat litter. Typically, they have an aggregate density of from about 0.2 to about 0.3 grams per cubic centimeter and an absorbent capacity of about 2 to about 2.5 of grams water per gram of particle. These properties can vary, of course, depending on the nature of the feedstocks used, the process conditions, the presence of additives, etc.

It will be appreciated that the foregoing process examples, shown only for purposes of illustration, are not to be construed as limiting the scope of this invention.

We claim:

1. A method for making cellulosic particles comprising:
    (a) agglomerating a moist blend of fibers, aggregates of fibers, and/or fiber-sized pieces of a fibrous cellulosic material in a substantially horizontal rotating drum to form individual agglomerated particles;
    (b) compacting the surface of the agglomerated particles to form a densified skin substantially free of protruding fibrils; and
    (c) drying the agglomerated particles.

2. The method of claim 1 wherein the surfaces of the agglomerated particles are compacted by bouncing and rolling the agglomerated particles in a fluidized bed dryer provided with upwardly flowing air.

3. The method of claim 1 wherein the surfaces of the agglomerated particles are compacted by rolling the particles in a second substantially horizontal rotating drum.

4. The method of claim 1 wherein the surface-compacted agglomerated particles are formed into platelets prior to being dried.

5. A method for making cellulosic particles comprising:
(a) agglomerating a moist blend of fibers, aggregates of fibers, and/or fiber-sized pieces of a fibrous cellulosic material in a substantially horizontal rotating drum to form individual agglomerated particles, said moist blend having from about 75 to about 85 weight percent moisture;
(b) compacting the surface of the agglomerated particles;
(c) partially drying the surface-compacted particles to from about 30 to about 50 weight percent moisture;
(d) forming the partially-dried particles into platelets; and
(e) drying the particles to a moisture content of about 10 weight percent or less.

6. The method of claim 5 wherein the surfaces of the agglomerated particles are compacted in a second substantially horizontal rotating drum.

7. The method of claim 6 wherein the surface-compacted particles are partially dried in a fluidized bed dryer.

8. The process of claim 7 wherein the partially dried particles are deposited on a moving belt and flattened in a nip between the moving belt and a press roll.

9. The process of claim 8 wherein the flattened particles are dried in a fluidized bed dryer to a moisture content of about 5 weight percent.

10. The process of claim 9 wherein the fibrous cellulosic material is selected from the group consisting of wastepaper, paper mill sludge, and combinations thereof.

* * * * *